April 28, 1931.  H. F. ARNOLD  1,802,549
IDLER PULLEY MECHANISM
Filed June 25, 1929  2 Sheets-Sheet 1
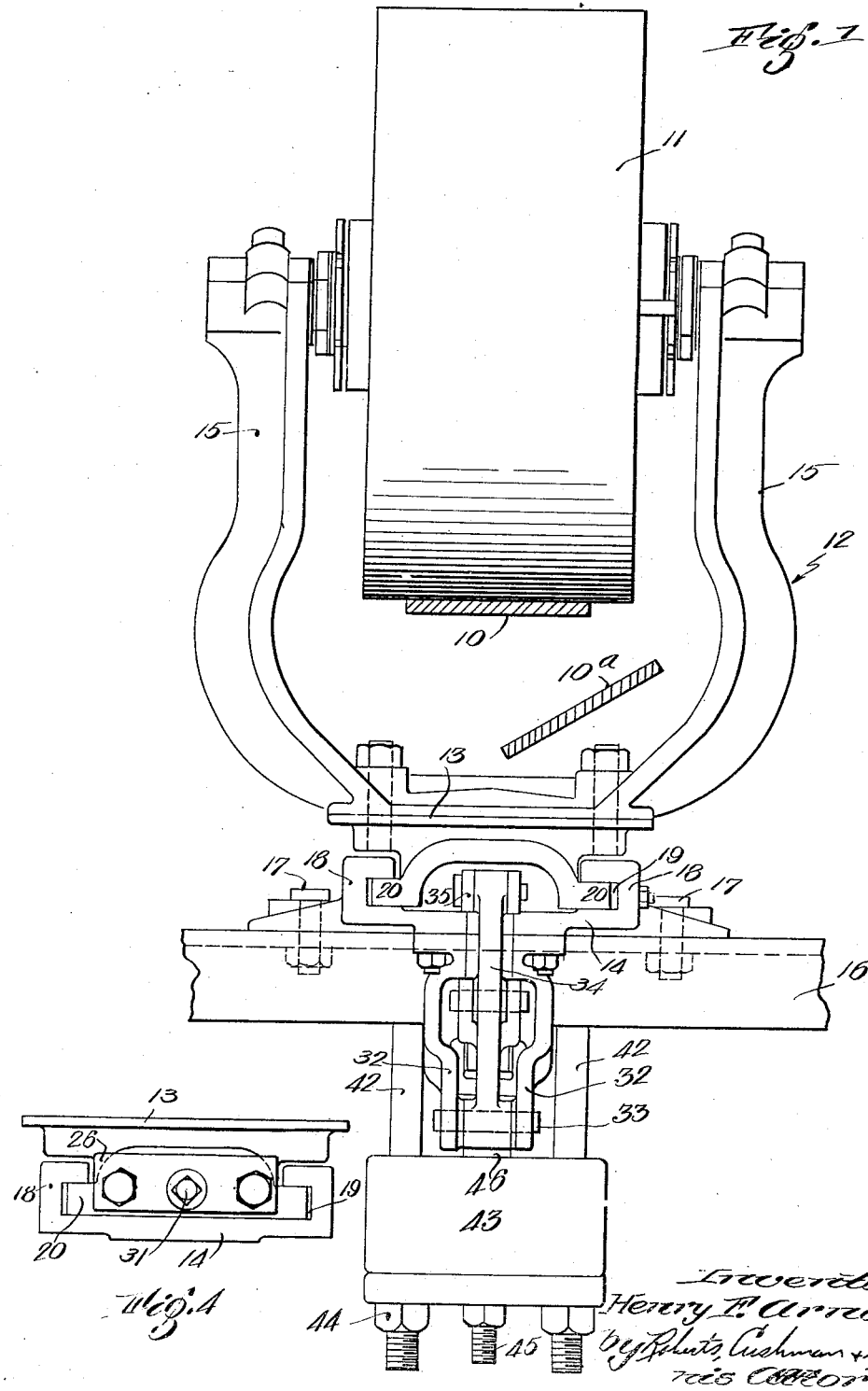

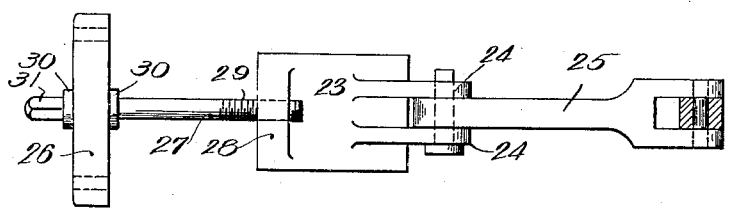
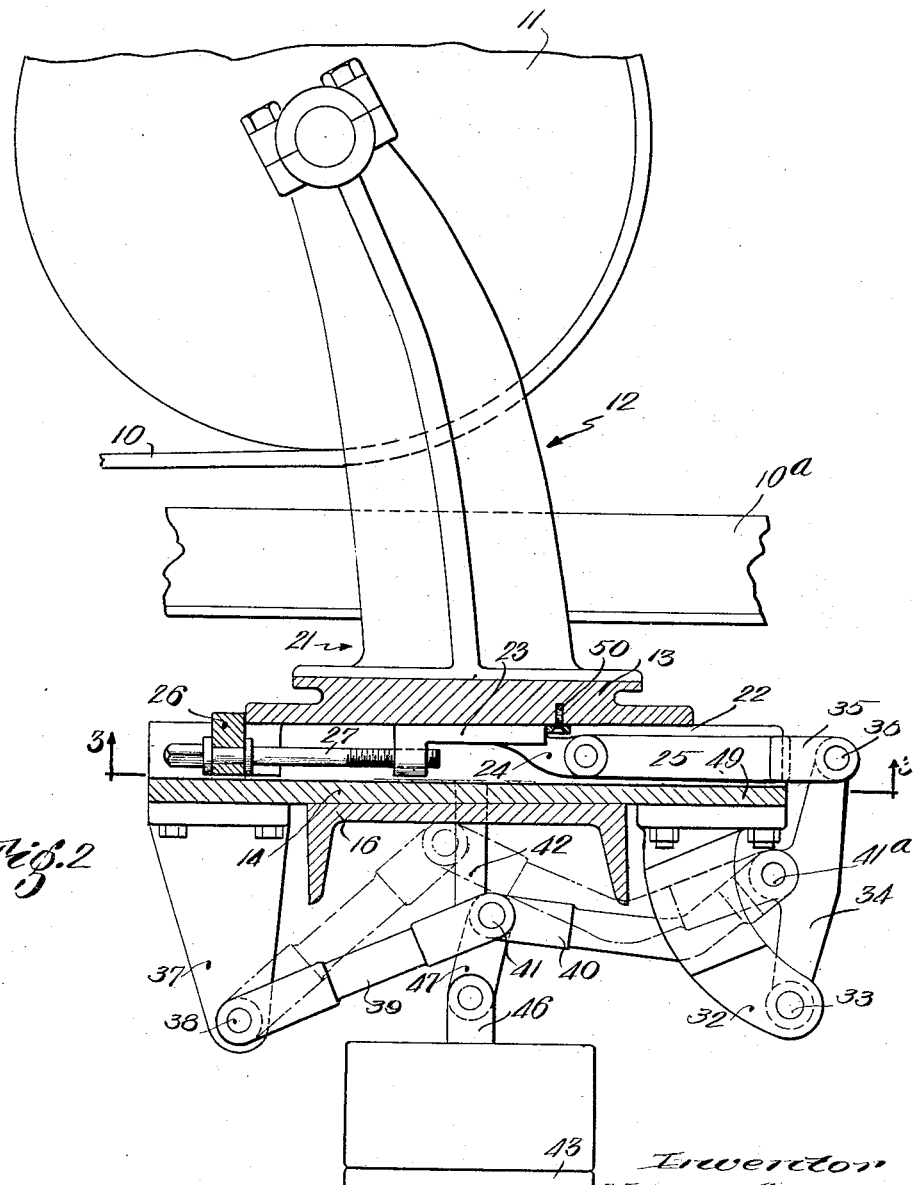

Patented Apr. 28, 1931

1,802,549

UNITED STATES PATENT OFFICE

HENRY F. ARNOLD, OF HYDE PARK, MASSACHUSETTS, ASSIGNOR TO AMERICAN TOOL & MACHINE COMPANY, OF BOSTON, MASSACHUSETTS, A CORPORATION OF MASSACHUSETTS

IDLER PULLEY MECHANISM

Application filed June 25, 1929. Serial No. 373,622.

This invention relates to an improvement in an idler pulley mechanism more particularly in one adapted automatically to tighten a belt being driven and to maintain it under a predetermined tension. In my copending application, Serial No. 130,564, filed August 21, 1926, U. S. Patent No. 1,762,149, issued June 10, 1930, I have disclosed a similar mechanism in which the belt under tension is located below this mechanism, whereas in the present invention the belt is located above such mechanism.

The invention here shown in common with that set forth in my copending application provides means whereby the belt is held under tension by the attraction of the force of gravity upon a vertically moving body, suitably connected by links and levers with a belt engaging pulley. It differs, however, from the mechanism of my copending application, not only in its relation, as above indicated, to the belt, but also in certain details of construction, whereby the desired operation is obtained and the adjustment of the tension to be applied is easily varied.

The primary object of this invention is to provide an idler pulley mechanism by which a belt engaging pulley mounted above such mechanism is automatically maintained in a position to subject the belt to a predetermined tension through the action of the force of gravity upon a vertically moving body whose power increases as the belt nears the predetermined tension.

Other objects of the invention will appear from a consideration of the following specifications taken in connection with the drawings which form a part thereof and in which:

Fig. 1 is an elevational view of one embodiment of this invention;

Fig. 2 is a side elevation thereof partly in section;

Fig. 3 is a sectional view of the draft mechanism taken along the line 3—3 of Fig. 2; and Fig. 4 is an elevation showing certain details of construction.

In the drawings the belt 10 to be placed under tension is passed around an idler pulley 11, suitably mounted in bearings in a bracket 12, the base 13 of which is suitably mounted on a supporting member 14. The bracket 12 comprises a pair of arms 15 between which the belt 10 travels and, as shown in the embodiment illustrated, between which the return lower section $10^a$ of the belt also travels. The supporting member 14 is rigidly secured upon a beam 16 in any suitable manner as by the bolts 17. The sides of the member 14 are preferably formed, as shown in Fig. 1, with hooked flanges 18 which provide a pair of parallel grooves 19 to receive the edges 20 of the base 13. The base 13 together with the arms 15 and the pulley 11 is thus movable longitudinally of the supporting member 14 and of the belt 10.

The movement of the bracket 12 in the direction indicated by the arrow 21 will obviously bear upon the belt 10 passed around the pulley 11, and thus place the belt under tension. The bracket 12 is moved in that direction by a draft mechanism 22 which comprises a plate 23 having a pair of loops 24 projecting from one end thereof, and an arm 25 pivotally secured at one end between the loops 24 upon a stud shaft.

Rigidly secured to the base 13 at one end of the bracket 12 is a bar 26 to which the plate 23 is connected by an externally threaded rod 27. The plate 23 has at the end opposite the loops 24 a downwardly projecting boss or bracket 28, provided with an internally threaded aperture with which the externally threaded end 29 of the rod 27 engages. The rod 27 is freely rotatable in the bar 26 being secured therein by a pair of collars 30, and terminates at its outer end in a squared or wrench-receiving portion 31.

Suspended from the supporting member 14 at one side of the beam 16 are brackets 32 which carry at their lower ends a stud shaft 33. The shaft 33 receives one end of a lever 34, the other end being received within the fork 35 into which the arm 25 terminates. A second pair of brackets 37 are suspended from the member 14 on the opposite side of the beam 16 and support at their lower ends a stud shaft 38 which receives one end of a link 39. The link 39 is connected to the lever 34 by a link 40, the ends of the link 40 being pivotally connected at 41 and 41ª to the link 39 and the lever 34 respectively. The links 39 and 40 thus constitute a toggle member, one end of which is held stationary by the brackets 37 while the other end is movable, being secured to the lever 34.

Depending from the member 14, intermediate the brackets 32 and 37, are a pair of posts 42 upon which slides a weight 43, the lower limit of movement of which is determined by nuts 44 at the bottom of the posts 42. Through the centre of the weight 43 extends a rod 45 which terminates at its upper end in an eye 46 connected to the joinder 41 of the links 39 and 40 by a link 47. The ends of the link 47 are pivotally mounted as is shown particularly in Fig. 2 and the rod 45 is rigidly secured to the weight 43 by a nut 48. The supporting member 14 is cut away at one end to provide a slot 49 between the brackets 32 which will permit the lever 34 to swing without interference with the member.

The weight 43, acting under the force of gravity will, of course, tend at all times to descend the posts 42 and rest upon the nuts 44. This movement of the weight acting through the link 47 will tend to close the toggle formed by the links 39 and 40. Since the pivot 38 of the link 39 is fixed, it obviously follows that the link 40 will move outwardly as indicated by a comparison of the dotted and full lines of Fig. 2 of the drawing, and thus swing the lever 34 outwardly on its lower pivot. The outward swing of the lever 34 causes the draw device 22 to move the base 13 of the bracket 12 to the right in Fig. 2, thus placing the belt 10 under tension. Since the links 39 and 40 constitute, as pointed out above, a toggle at the center of which the weight 43 constantly exerts its pressure, it will obviously follow that, as the pressure of the belt 10 tending to move the pulley 11 to the left (Fig. 2) increases, the pressure of the tension mechanism, tending to move the pulley 11 to the right, will also increase, thus insuring that the belt remains under the predetermined tension.

The amount of tension applied to the belt 10 is regulated by rotating the rod 27, thus shifting the plate 23 relative to the bar 26. Obviously, as the plate 23 is shifted in either direction, the lever 34 is also moved in the same direction, the angle between the links 39 and 40 forming the toggle, is altered and the weight 43 is raised or lowered upon the posts 42. In order to prevent the adjustment of the plate 23 to such an extent that the toggle formed by the links 39 and 40 will, under the action of the weight, reverse its position or that the weight 43 will rest upon the nuts 44 there is secured to the base 13 a limit stop 50 which may be of any type desired.

One embodiment of this invention has been shown and disclosed, but I am not limited thereby, since other embodiments could be made without departing from the spirit and scope of the invention as set forth in the following claims.

I claim:

1. Mechanism for tensioning a belt comprising a pulley over which the belt passes, a bracket comprising arms by which the pulley is rotatably supported and a base, a supporting member upon which the base rests and over which the bracket is movable longitudinally of the belt and means tending to move the bracket over the member in the direction to tension the belt comprising a lever pivoted at its lower end to a stationary element, adjustable means connecting the lever to the base, toggle mechanism comprising a pair of pivotally connected links, one end of the toggle mechanism being pivoted to a stationary element and the other end being pivoted to the lever and a weight below the bracket and acting upon the pivotal connection of the links, normally tending to close the toggle mechanism and thereby causing said lever to act, through the adjustable connecting means, upon the bracket.

2. Mechanism for tensioning a belt comprising a pulley over which the belt passes, a bracket comprising arms by which the pulley is rotatably supported and a base, a supporting member upon which the base rests and over which the bracket is movable longitudinally of the belt, stationary elements depending from each end of the supporting member and means tending to move the bracket over the member in the direction to tension the belt comprising a lever pivoted at its lower end upon one of said elements, adjustable means connecting the lever to the base of the bracket, toggle mechanism pivoted at one end upon the other stationary element and at the other end upon the lever, a weight guided for vertical movement and a link connecting the weight to the toggle mechanism whereby the weight normally tends to close the toggle mechanism and thereby cause the lever to act, through the adjustable connecting means, upon the bracket.

3. Mechanism for tensioning a belt comprising a pulley over which the belt passes, a bracket comprising arms by which the pulley is rotatably supported and a base, a supporting member upon which the base rests and over which the bracket is movable longitudinally of the belt, stationary elements depending from each end of the supporting member, guiding means depending from the member intermediate the elements and means tending to move the bracket over the member in the direction to tension the belt comprising a lever pivoted at its lower end upon one of said elements, adjustable means connecting the lever to the base of the bracket, toggle mechanism pivoted at one end upon the other stationary element and at the other end upon the lever, a weight movable upon the depending guiding means and a link connecting the weight to the toggle mechanism whereby the weight normally tends to close the toggle mechanism and thereby cause the lever to act, through the adjustable connecting means, upon the bracket.

4. Mechanism for tensioning a belt comprising a pulley over which the belt passes, a bracket comprising arms by which the pulley is rotatably supported and a base, a supporting member upon which the base rests and over which the bracket is movable longitudinally of the belt and means tending to move the bracket over the member in the direction to tension the belt, said means including power exerting mechanism comprising toggle links and a lever actuated thereby and means connecting such mechanism to said bracket comprising a bar attached to the base of the bracket, a plate articulately connected to the lever of said mechanism and means connecting said bar and plate for adjusting the distance between the bar and the plate.

5. Mechanism for tensioning a belt comprising a pulley over which the belt passes, a bracket comprising arms by which the pulley is rotatably supported and a base, a supporting member upon which the base rests and over which the bracket is movable longitudinally of the belt and means tending to move the bracket over the member in the direction to tension the belt, said means including power exerting mechanism comprising toggle links and a lever actuated thereby and means connecting such mechanism to said bracket comprising a bar attached to the base of the bracket, a plate, an arm pivotally secured to the plate and to the lever of said mechanism and an externally threaded rod in threaded engagement with the plate and in rotatable engagement with the bar for adjusting the distance between the bar and the plate.

Signed by me at Boston, Massachusetts, this 18th day of June, 1929.

HENRY F. ARNOLD.